United States Patent [19]

Krusche et al.

[11] Patent Number: 4,617,798

[45] Date of Patent: Oct. 21, 1986

[54] HYDROSTATIC DRIVE SYSTEMS

[75] Inventors: Alfred Krusche, Johannesberg; Walter Kropp, Sulzbach am Main, both of Fed. Rep. of Germany

[73] Assignee: Linde Aktiengesellschaft, Wiesbaden, Fed. Rep. of Germany

[21] Appl. No.: 596,293

[22] Filed: Apr. 3, 1984

[30] Foreign Application Priority Data

Apr. 13, 1983 [DE] Fed. Rep. of Germany ....... 3313450

[51] Int. Cl.[4] .............................................. F16D 31/02

[52] U.S. Cl. ......................................... 60;450; 60/420; 91/446; 137/625.68

[58] Field of Search .............. 137/596, 625.68, 596.13; 91/446, 525, 526, 528, 420, 447; 60/420, 450, 445, 452, 427, 426

[56] References Cited

U.S. PATENT DOCUMENTS 3,565,110 2/1971 Hodgson .................... 137/625.68 X
4,122,865 10/1978 Budzich .......................... 137/596.13
4,187,877 2/1980 Hodgson et al. .......... 137/625.68 X

*Primary Examiner*—Edward K. Look
*Attorney, Agent, or Firm*—Buell, Ziesenheim, Beck & Alstadt

[57] ABSTRACT

A hydrostatic drive is provided having an adjustable pump connected with a pump servo positioned by a control pressure from a line connected between the consumer and an adjustable measuring restrictor which in turn is connected to a switching means which includes a plurality of hollow ended main spools in boreholes in a housing, and secondary spools in said hollow ends acting with radial passages in the main spool to form parallel connected restrictors.

8 Claims, 6 Drawing Figures

HYDROSTATIC DRIVE SYSTEMS

This invention relates to hydrostatic drive systems and particularly to a hydrostatic drive system with an adjustable pump connected with a pump servo positioned by a control pressure from a line connected between the consumer and an adjustable measuring restrictor.

Hydrostatic drive systems with an adjustable pump whose adjusting element is connected with a pump servo piston capable of moving in a pump operating cylinder, the position of which is determined by a control pressure derived from the drive system are known. Such drive systems, which operate according to the load-sensing method, but in which one consumer is acted upon by a higher pressure than the other through a parallel-connected restrictor even with parallel connection of the consumers, make it possible for the two consumers to run with the controlled speed in spite of the pressure difference and are very good and progressive. It is however quite difficult to introduce such systems into the constructions currently known, where slide valves, block operating mechanisms in particular, are to be used in the mechanisms to be controlled on the basis of the steering technique used to date.

The invention proposes to refine such hydrostatic drive systems so that they can also be advantageously used in systems with regulation by slide or spool valves or, inversely to refine a slide or spool valve, especially one of a block operating mechanism, so that it is suitable for use with a drive system according to the system described above.

This problem is solved in the present invention by providing a hydrostatic drive system having an adjustable pump, an adjusting element on said pump, a pump servo piston connected to and capable of moving said adjusting element, said servo piston being movable in a cylinder, a main feed line from said pump, a plurality of consumers of pressure fluid, a branch feed line connecting each consumer to said main feed line, a return line from each consumer to a reservoir, a switching means in each branch line, a pair of adjustable parallel connected restrictors in each branch line, spring loaded adjusting means on each of said restrictors for adjusting the same, a connection from said branch line to the adjusting means delivering pressure fluid to the side opposite the spring, control pressure means supplying a control pressure fluid acting with said spring load on the other side of said adjusting means, said control pressure fluid exerting an identical pressure on all of the parallel connected restrictors, an adjustable measuring restrictor in the branch line leading to each consumer between said parallel restrictor and the consumer, said control pressure means being connected to the branch line between the adjustable measuring restrictor and its adjacent consumer, said switching means including a valve housing having a longitudinal bore, a main spool movable in said bore, said spool being hollow at each end, an inlet port in said housing connected to the main feed line and to said bore, an outlet in said housing connected to said control pressure means and to said bore adjacent the inlet connection to said bore, a secondary spool in each of the hollow ends of said main spool, spring means in each of said hollow ends acting on said secondary spools to urge them towards the two ends of the main spool, and a plurality of spaced radial passages in said main spool communicating with said hollow ends, said secondary spools forming with said radial passages said parallel connected restrictors. Preferably the switching means is a valve having a housing connected to the main feed line and having a longitudinal bore, a main spool hollow at both ends movable in said bore, an inlet chamber in the housing communicating with said bore intermediate its ends and communicating between said bore and the feed line, an exhaust chamber at each end of the housing communicating with the bore and said reservoir, a work chamber at each end of the housing intermediate the inlet and exhaust chambers and connected to the consumers of pressure fluid, a secondary spool in each of the hollow ends of said main spool, spring means in each of said hollow ends acting on said secondary spools to urge them towards the two ends of said spool, a plurality of spaced radial passages in said main spool communicating with said hollow ends, said radial passages being spaced so that in a working position they communicate between and variably restrict flow between the work chambers and one of the inlet chambers in one position and the exhaust chambers in a second position. An annular transfer groove is provided in the secondary spools intermediate their ends selectively to connect the said radial passages within the hollow ends of the main spool, and annular sensing grooves are provided in the secondary spool at each end with sensing passages extending from each sensing groove to the opposite end of the secondary spool for delivering fluid thereto. The inlet chamber is preferably bifurcated to extend on opposite sides of an outlet chamber in the housing and communicating with the longitudinal bore and the reservoir.

This invention thus solves the problem of the prior art by a space saving and cost saving arrangement of the parallel-connected restrictor within a single valve assembly. It is possible with this inventive arrangement to improve the restrictor system functionaly over the load-sensing system without incurring substantial extra expenses.

In normal block operating mechanisms two annular groove channels are provided in the middle section for by-pass. In the embodiment according to the invention it is possible to use these two channels for connecting the control pressure line or to provide only a smaller annular groove channel in view of the smaller stream in the line instead of the two annular groove channels that had been provided to date for by-pass purposes. The housing thus becomes less expensive than in the block operating mechanisms known to date.

It is also conceivable through the embodiment according to the invention to reduce the block operating mechanisms in single-unit construction to individual slide or spool valves. Then only a few different types need be kept in reserve and the installation can be more favorable according to need, e.g., closer to the consumer or closer to the operating mechanism, and fewer different replacement parts have to be kept in reserve.

It is essential to the invention that in the case of a spool valve, where an auxiliary piston or spool is installed in the valve spool of the valve, this auxiliary piston or spool itself and the channels through which it is loaded with pressure or which are controlled by it be redesigned and arranged so that this auxiliary piston or spool assumes the function of the parallel-connected restrictor and that the measuring restrictor also be provided in the valve spool. Furthermore, the check valve can either be provided directly as is in the valve piston or, in particular, directly in the auxiliary piston or the overall arrangement, especially in the embodiment according to FIGS. 5 and 6, can be provided so that an auxiliary slide in the valve piston inhibits the backflow due to the pressure load on the surfaces at the auxiliary piston (compensator), because the auxiliary piston blocks off the return flow at the corresponding pressure gradient. Favorable embodiments also result from the fact that various flow paths for the control pressure on the one hand and for the output stream on the other, which is to flow to the consumer and which should encounter as little resistance as possible, except for that required for producing a measuring pressure gradient at the measuring restrictor, are presented.

In the foregoing general outline of our invention we have set out certain objects, purposes, and advantages of this invention. Other objects, purposes and advantages of this invention will be apparent from a consideration of the following description and the accompanying drawings in which.

Figure 1:
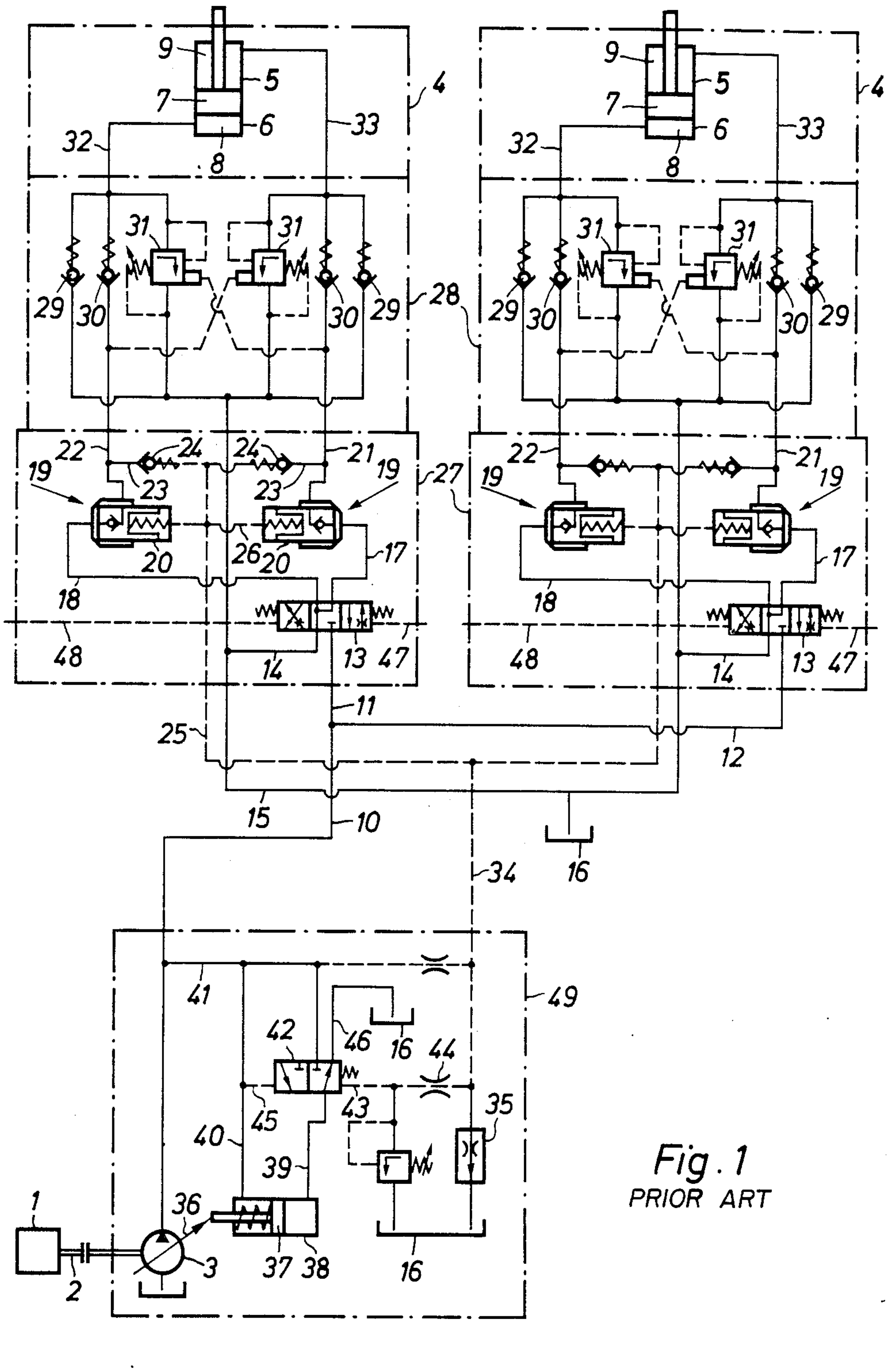
Fig. 1 PRIOR ART
FIG. 1 shows a circuit diagram for the state of the art hydrostatic drive system which was used as a basis for the present invention.
Figure 2:
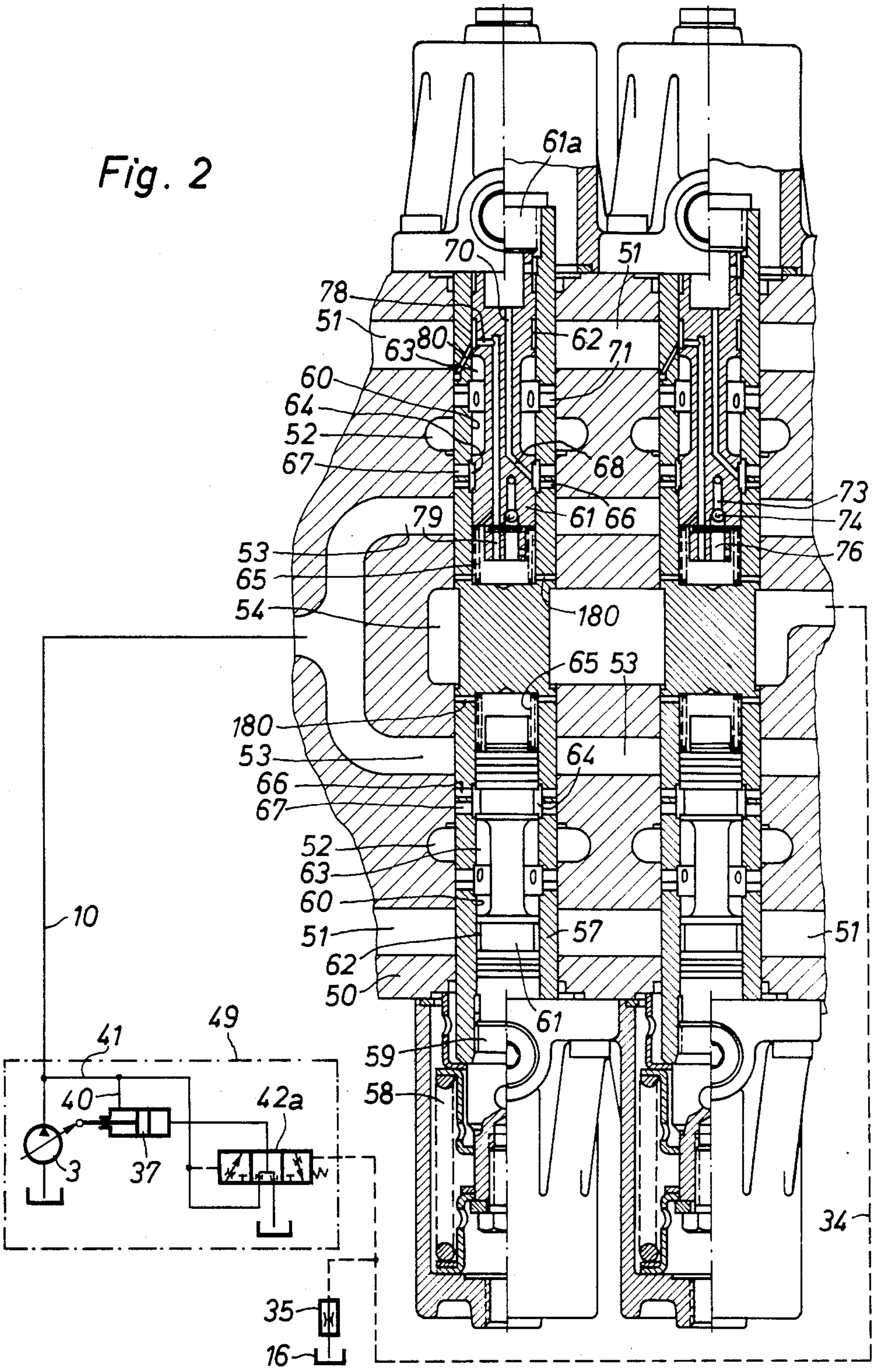
FIG. 2 shows in cross section a slide or spool valve with two spools designed according to a preferred embodiment of the invention.
Figure 3:
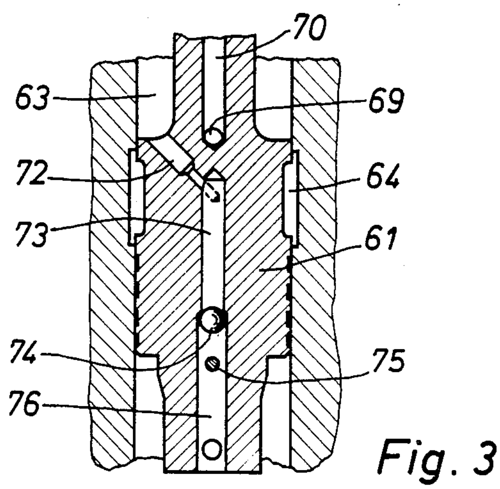
FIG. 3 shows part of FIG. 2 in a larger scale.

Referring to the drawings we have illustrated in FIG. 1 a circuit diagram of a prior art arrangement and in FIGS. 2 and 3, a preferred form of our invention in which an internal combustion engine 1 drives pump 3 through shaft 2. Consumers 4 and 5, each of which is a double acting cylinder 6 are connected to pump 1 and receive pressure fluid from it. A piston 7 in cylinder 6 lies between a large pressure chamber 8 in cylinder 6 and a pressure chamber 8*a* on the piston rod side within cylinder 6. A feed line 10 goes out from the pump 1 and forks into two branch lines 11 and 12. Each of these two branch lines 11 and 12 leads to a valve 13, which has two functions:

(a) the valve 13 acts as an arbitrarily adjustable measuring restrictor (b) through the valve 13 it is possible to selectively connect either the line 11 with line 17 and line 18 with line 14, which leads through line 15 to a pressureless reservoir or, in another switching position, to connect the line 11 with line 18 and line 17 with line 14, or in a third switching position to shut off the line 11 and connect the two lines 17 and 18 with the line 14.

The two lines 17 and 18 each lead to a parallel-connected restrictor 19, in which a valve piston or spool 20 is capable of sliding against the force of a spring, in which case the line 17 or 18 empties in the space in front of the face of the valve piston 20, which is pressed by the spring against a conical seat, which limits the space into which the line 17 or 18 empties. A line, which is designated by either 21 or 22, continues on from the annular space around the valve piston 20 to the consumer. A branch line 23 is connected to each of these lines 21 or 22 and a check valve 24 is located in it, whereby the two lines 23 are connected beyond the check valve 24 to a control pressure line 25. A branch line leads from this control pressure line 25 to the space in front of the second face of the valve piston 20, in which the pressure spring is located.

According to the invention, the components 13, 19/20, and 24 are combined with the assigned lines to form a valve piston 27.

The lines 21, 22, and 15 lead to a valve group 28, which is of subordinate importance in connection with the present invention and are located in the check valve 29, check valve 30, and the pressure-limiting valve 31, whereby the pressure-limiting valve switched parallel to the line 22 and thus assigned to it is controlled as such by the pressure in line 32 and, inversely, the pressure-limiting valve 31 assigned to line 21 is controlled by the pressure in line 33. These pressure-limiting valves act at the same time as the backflow restrictor, where in this case the pressure-limiting valve 31 assigned to line 22 is controlled by the pressure in line 21 and, inversely, the valve assigned to line 21 as a backflow restrictor is controlled by the pressure in line 22.

The control pressure line 25 is connected to a control pressure line 34, which leads through a stream-regulating valve 35 to the reservoir 16.

The final control element 36 of the pump 3 is connected with a servo piston 37, which is designed as a differential piston and is capable of sliding in an operating cylinder 38, whose pressure chamber acting on the large surface of the servo piston 37 is connected to a line 39 and whose pressure chamber on the piston rod side is connected to a line 40, which is connected through a line 41 to the feed line 10. The line 39 is connected on the outlet side to a hydraulically actuated 2-position/3-connection valve 42, one control pressure chamber of which is connected to the control pressure line 34 through the control pressure line 43, in which a restrictor 44 is located, and the other control pressure chamber of which is connected to the line 40 through the line 45 and is thus always loaded with the pressure in the feed line 10. The drain line 46, which leads to the reservoir 16, is connected to the third connection of valve 42. The valve 42 is also spring-loaded, such that the valve 42 connects the line 41 with the line 39 only if the pressure in the control pressure line 45 is greater by a definite amount than the pressure in the control pressure line 43.

The slide valve 13, in which the measuring restrictor is formed, can be arbitrarily loaded with control pressure by means of the two lines 47 and 48 in order to shift this valve into the switching position.

The mode of operation is as follows: a pressure gradient is produced at the measuring restrictor in the valve 13, which effects a difference between the pressures in the lines 11 and 25 or 12 and 25, with the result that the same pressure difference prevails between the feed line 10 and the control pressure line 34. The adjusted opening of the measuring restrictor thus determines the pressure difference that arises with a definite stream between the lines 10 and 34 and thus the difference in the two control pressure chambers of the valve 42. Inversely, if a certain pressure difference is prescribed, the opening of the measuring restrictor determines the stream at which this pressure difference arises. If the feed pressure increases in the line 10 and the pressure remains the same in the control pressure line 34 because an excessively large stream flows to the measuring restrictor, valve 42 connects line 41 with line 39, with the result that the pressure medium is introduced into the large pressure chamber of the operating cylinder 38 and thus the servo piston 37 is shifted to the left in the drawing and the pump 3 is thus set to a smaller delivery volume per revolution. On the other hand, if the pressure drops in the delivery line 10 due to an excessively small delivery stream as compared with the control pressure in the control pressure line 34, the valve 42 connects the line 39 with the line 46, so that the large pressure chamber in the operating cylinder 38 is released and the pump 3 is thus set to a greater stroke volume per revolution (load-sensing method). The parallel-connected restrictor 19/20 causes a constant pressure to prevail in lines 11 and 12 that is sufficient for the most highly loaded consumer 4 or 5, while the pressure fed to the consumer 4 or 5 is always present in the line 22 or 21 beyond the parallel-connected restrictor 19/20. The pump 3 with its switching members is surrounded by a housing 48.

In the embodiment according to FIG. 2, parallel boreholes are provided in the operating mechanism housing 50. In additon, three pairs of symmetrically arranged annular groove channels 51, 52 and 53 are installed, of which the channels 51 lying farthest out are connected with the reservoir 16, which is connected to one of the adjacent channels 52 with the line 21 and the other of channels 52 with the line 22, and the channels 53 located farthest to the middle are connected with the feed line 10 of the pump. A central annular chamber 54 is also provided; it is connected with the control pressure line 34.

A valve piston 57 is capable of sliding in each of the parallel longitudinal boreholes of the housing 50. The space in front of one of the faces of the valve piston 57 can be loaded with pressure through the line 47 and the space in front of the other face can be loaded with pressure through the lines 48. In the lower pressure chamber in the drawing a spring 58 with spring plates and stops is connected to a plug 59 such that the spring 48 is compressed with each displacement of the valve piston 57 from the neutral position shown in the drawing. An axial borehole 60 in the valve piston 57 is closed off by the plug 59 and a borehole 60 arranged symmetrically to it in the valve piston is closed off by the plug 61*a*. An auxiliary piston 61 slides in each of these boreholes 60; it has three annular grooves 62, 63, and 64 on its periphery and is supported against a spring 65.

Narrow radial boreholes 66 and wider radial boreholes 67 are located in the valve piston 57, in a region of the valve piston that lies between the annular groove channels 52 and 53 when it is in its neutral postion.

These radial boreholes 66 and 67 act as measuring restrictors. If the valve piston is shifted by a small amount with respect to the housing 50, the edge of the narrower borehole 66 will project over the edge of the channel 53 and with further displacement of the valve piston 57 the borehole 66 becomes quite free and thus a larger restrictor cross section is released, until the additional borehole 67 comes in connection with the channel 53. In the position shown in the drawing the annular groove 64 of the auxiliary piston 61 lies in front of the inner mouths of the boreholes 66 and 67. An oblique borehole 68 empties into the annular groove 64 and it empties with a mouth 69 into the axial borehole 70, which empties into the space in front of the outer, non-spring-loaded face of the auxiliary piston 61 so that if pressure is present in the annular groove 64 through the boreholes 68 and 70, this pressure passes through the boreholes 68 and 70 also into the pressure chamber in front of the outer face of the auxiliary piston 61, so that this pressure displaces the auxiliary piston 61 against the force of the spring 65. During this displacement the auxiliary piston 61 assumes a position in which the large annular groove 63 connects the boreholes 67 and 66 with the boreholes 71 in the valve piston 57, in which case with the displacement of the valve piston 57 these boreholes 71 again empty into the annular channel 52 and thus open up a flow path for the output stream that leads from the pump 3 through the feed line 10, the annular channel 53, the borehole 67, the annular groove 63, the borehole 71, and the annular channel 52 and through the line 21 or the line 22 to the consumer. An oblique borehole 72 goes out from the annular groove 63 and empties into a longitudinal borehole 73, in which a check valve ball 74 is located and is held from falling out of the wider section 76 of the borehole 73, 76 by a pin 75. If a higher pressure is present in the annular groove 63, it can thus spread through this borehole system 72, 73, 76 in front of the inner face of the auxiliary piston 61. However, if there is a higher pressure in front of this face than in the annular groove 63, no back flow can occur due to the action of the check valve ball 74.

The annular space 62 is connected through two boreholes 78 and 79 with the inner, spring-loaded face of the auxiliary piston 61. A borehole 80 located in the valve piston 57 empties into this annular space 62 and its outer mouth, depending on the displacement positon of the valve piston 57, is connected with the annular groove 51 or is covered by the borehole wall in the other displacement position.

Radial boreholes 180 are also provided in the valve piston 57; they empty into the space in front of the inner, spring-loaded face of the auxiliary piston 61 and, with an appropriate displacement of the valve piston 57, connect this space in front of the inner face with the annular groove channel 54.

The radial boreholes 66 and 67 in the valve piston 57, which serve as restrictors, thus correspond to the measuring restrictor in the valve 13 according to FIG. 1. The throttling of the stream flowing to the consumer at the edge of the annular channel 63 corresponds to the parallel-connected restrictor 19/20 according to FIG. 1 and the check valve ball 74 in the channel 73–76 corresponds to the check valve 24 according to FIG. 1. All the functional elements contained in the unit 27 according to FIG. 1 are thus realized in the valve piston 57 in connection with the borehole in the housing 50.

Figure 4:
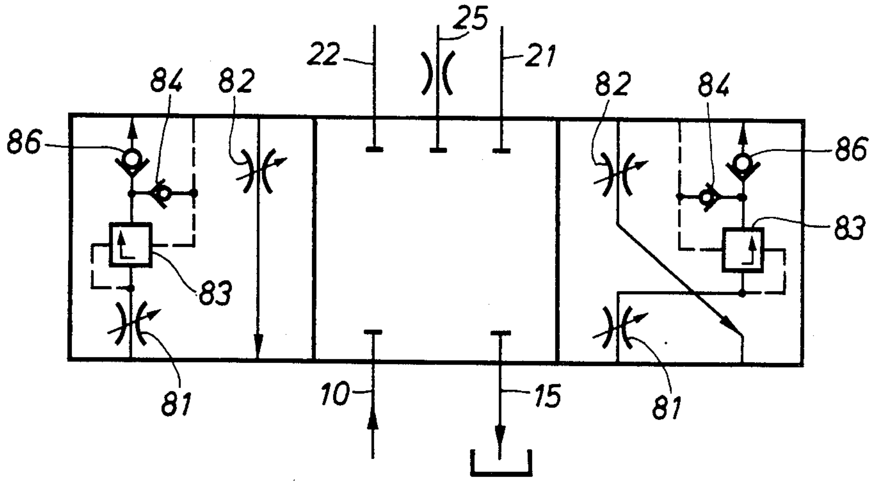
FIG. 4 shows a circuit diagram for FIG. 5.

A circuit diagram is shown in FIG. 4 in which all the functions that are combined in the valve piston 97 are presented. The restrictors 81 and 82 are formed at the edges of the channels in the valve piston 97. The valve 83 corresponds to the parallel-connected restrictors 19 and 20. The valve 83 is realized through the auxiliary piston 61 and the spring 65.

The check valve 84 corresponds to the check valve ball 74 in the channel 73–76 and/or the check valve 24 in FIG. 1 and the action of the check valve 86 is achieved through the action of the auxiliary slide 61.

One shortcoming of this embodiment resides in the fact that, if the consumer 4 or 5 is under load and can be held when the valve piston 57 is in the neutral position and if such a consumer under load is to be further shifted against the load, e.g., raised further, the annular channel groove 52 in connection with the consumer is connected with the annular channel groove 54 that is connected with the signal line 34 and which is not closed due to the steam-regulating valve 35, with the result that the consumer slowly drops before it effects the desired displacement movement under load.

The space in front of the face of the auxiliary piston 61 facing away from the spring 65 is connected through the borehole 70 with the space that lies in the direction of flow beyond the boreholes 66, 67 that act as measuring restrictors and the space in front of the face of the auxiliary piston 61, in which the pressure spring 65 lies, is connected on the side of the valve piston 57 on which the latter connects the annular channel groove 53 with the channel annular groove 52 in the given displacement position with the annular groove 54 loaded with control pressure, while this space in front of the face of the auxiliary piston 61 is connected with the channel annular groove 51 on the other side of the valve piston 57 on which the latter connects the channel annular grooves 51 and 52 with each other.

Because the pressure of the consumer 4 or 5 acts on the face of the auxiliary piston 61 loaded by the pressure spring and the feed pressure acts on the opposite face of the auxiliary piston 61, the latter acts as a load protection that prevents an untoward dropping of the consumer 4 or 5. The auxiliary piston 61 also acts as a parallel-connected restrictor control element that maintains the pressure difference at the measuring restrictor constant if through it the pressure in the feed line to an additional parallel connected consumer (e.g., 5 to 4) is higher than that of the consumer controlled by this valve 50–57, because the pressure in the control pressure annular space 54 acts on the spring-loaded face of the axuiliary piston 61, while the pressure arising in the direction of flow beyond the measuring restrictor acts on the opposite face of the auxiliary piston 61.

Figure 5:
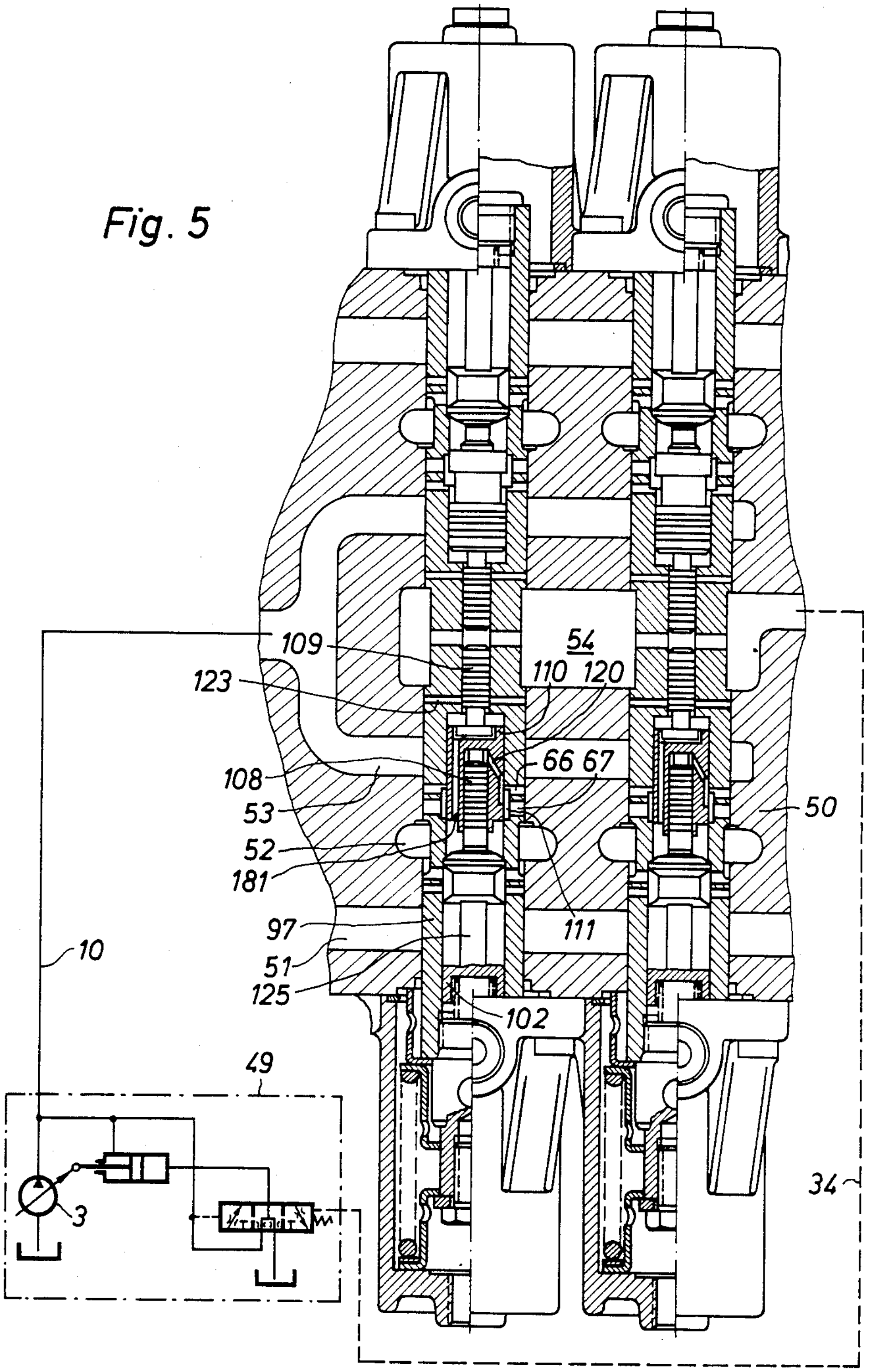
FIG. 5 shows a section through a slide or spool valve in an embodiment different from that in FIG. 2.
Figure 6:
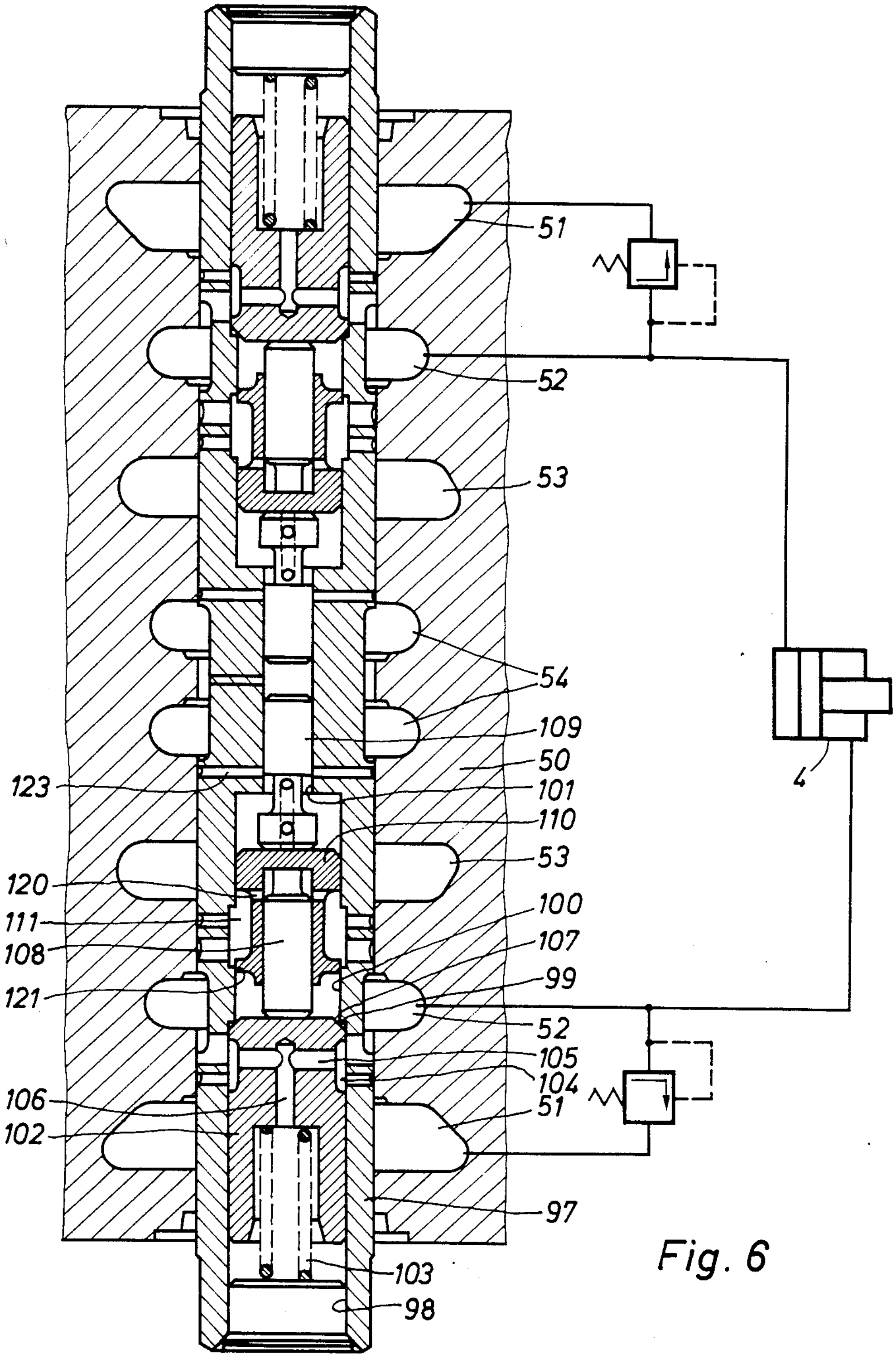
FIG. 6 shows an embodiment that essentially corresponds to that in FIG. 5, where the inner pistons or spools are also shown cutaway.

In the embodiment shown in FIGS. 5 and 6 the shortcomings of the above embodiment may be avoided. The housing 50 is the same as in the embodiment of FIG. 2, with the only difference that in the embodiment shown in FIG. 5, but not in that shown in FIG. 6, the annular groove channel 54 is divided into two channels corresponding to the previous conventional embodiment. However, the housing 50 has the same annular groove channels 51, 52, 53 and 54 and parallel longitudinal boreholes, in which case a valve piston 97 slides in each of these longitudinal boreholes instead of the valve piston 57 present in the embodiment according to FIG. 2. The radial boreholes 66 and 67 which act as measuring restrictors are again located in this valve piston 97, and again so that they are situated between the annular groove channels 52 and 53 when the valve piston 97 is in the neutral position. However, in this embodiment according to FIGS. 5 or 6 the auxiliary piston is divided into several partial pistons and the longitudinal borehole in the valve piston 97 has three parts of different diameter, i.e., an outer section 98 that has the largest diameter and passes into a narrower section 100 on a conical surface 99, and the narrowest section 101. An auxiliary piston 102 is located in the borehole section 98; it is supported against a spring 103 and has an annular groove 104, into which the radial boreholes 105 empty and are connected with an axial borehole 106 and which in turn empty into the outer, thus spring-side space in front of the auxiliary piston 102. The auxiliary piston 102 has a conical surface 107, which together with the conical surface 99 forms a seat valve that serves to secure the load. The auxiliary piston 102 has the action of the check valve 30 according to FIG. 1. The compensating piston 108 has the same diameter as the piston 109, which slides in the narrowest section 101 of the borehole. Between the two there is a sliding sleeve valve 110, which has an annular groove 111 and in which a pressure-equalizing borehole 181 is provided and connects the space in front of the annular face of the sliding sleeve valve 110 with the space in front of the other face of this sliding sleeve valve 110. A radial borehole 120 goes out from the annular groove 111 into the space in the inner borehole of the sliding sleeve valve 110, which is closed off by the piston 108 sliding in this borehole. As a result, the pressure beyond the borehole 66 or 67 acting as the measuring restrictor acts in the space on the faces of the piston 108 on the one hand and inner surface of the borehole in the sliding sleeve valve 110 on the other. This force acts through the face of the sliding sleeve valve 110 on the compensating piston 109, which is loaded by the pressure in the control pressure line 34 on its face that is directed toward the middle of the valve piston 97.

A throttling effect that coresponds to the action of the parallel-connected restrictor 19, 20 in FIG. 1 develops at the edge 121 that works together with the edge of the borehole 100. Due to the fact that the pressure of the consumer with the highest pressure is present in the line 34 and thus also in the annular groove channels 54, a force that is determined by the pressure of the consumer with the highest load always acts on the compensating piston 109 at its face. The force thus induced acts on the sliding sleeve valve 110, on whose two outer faces the same pressure acts as a result of the pressure-equalization channel, during which however the pressure beyond the measuring restrictor 66, 67 acts in the inner space. Now if the pressure in the control pressure line exerts a greater force on the face of the compensating piston 109 due to the fact that a consumer connected in parallel to the consumer that is controlled by this valve piston 97 has a higher pressure, this greater force presses the sliding sleeve valve 110 against the force of the spring 103. If a lower pressure prevails in the feed line 10 of the pump 3 and thus in the annular groove channel 53 than in the lines 22 or 21 that leads to the consumer and is connected to the annular groove channel 52 (this state can arise, for example, if the valve piston 97 is in its neutral position and the consumer is a piston-cylinder unit under load), then the pressure present in the annular groove channel 52, i.e., in the line leading to the consumer, also acts through the borehole 105, 106 on the spring-side face of the auxiliary piston 102 and presses it against the valve seat 99/107 and thus results in a sealing ("protection against falling back down"). If no parallel-connected consumer is present or each parallel-connected consumer is acted upon with a lower pressure than the consumer controlled by this valve piston 97, the pressure medium flows out of the space in front of the face of the sliding sleeve valve 110 through the pressure-equalization borehole in the latter, into the space in which the compensating piston 109 lies against the face of the sliding sleeve valve 110 and because the compensating piston 109 is pushed back so far in this state that it opens up the radial borehole 123, the pressure is led on this path into the annular groove channel 54 and from the latter into the control pressure line, so that the control pressure line is loaded with the pressure of the consumer that is controlled by this valve. The borehole 123 is connected with the annular groove channel 54. The inner mouth of the borehole 123 is located and the compensating piston 109 is designed so that if the pressure in the control pressure line 34 and thus in the annular groove channel 54 is higher than the pressure of the controlled consumer, the compensating piston 109 covers the inner mouth of the borehole 123 and thus prevents the pressure medium from flowing from the annular groove channel 54 into the space in front of the sliding sleeve valve 110 and thus through the pressure-equalizing channel into it. The outer mouth of the borehole 123 is located in the valve piston 97 such that this mouth of the borehole in the housing 50 is covered if the valve piston is displaced so that on this side the connection between the annular groove channel 52 connected to the consumer 4 or 5 and the annular groove channel 51 connected with the reservoir is effected, with the result that on this side of the valve 50, 97 the pressure medium is prevented from flowing out from the annular groove channel 54 through the borehole 123 on the said path through the sliding sleeve valve 110.

In the sliding sleeve valve 110, which is designed as a hollow piston, the inner space and thus the space in front of the outer face is connected with the pressure in the direction of flow beyond the measuring restrictor, the piston 109 is acted upon by the pressure in the control pressure line 34 and causes the pressure difference at the measuring restrictor to be maintained constant if the pressure level in the pump feed line 10 and the control pressure line 34 through a second consumer connected in parallel to the consumer acted upon by means of this valve 50/97 is higher than the pressure level of the controlled consumer. At the same time, it shuts off the connection between consumer and control pressure line 34 and thus avoids the shortcomings of the embodiment according to FIG. 2.

The groove 125 on the outer periphery of the auxiliary piston according to FIG. 5 replaces the boreholes 105–106 in the embodiment according to FIG. 6.

In the foregoing specification we have set out certain preferred practices and embodiments of our invention, however it will be understood that this invention may be otherwise embodied within the scope of the following claims.

We claim:

1. In a hydrostatic drive system having an adjustable pump, an adjusting element on said pump, a pump servo piston connected to and capable of moving said adjusting element, said servo piston being movable in a cylinder, a main feed line from said pump, a plurality of consumers of pressure fluid, a branch feed line connecting each said consumer to said main feed line, a return line from each consumer to a reservoir, a switching means in each branch line, a pair of adjustable parallel connected restrictors in each branch line, an adjusting element in each of said parallel connected restrictors loaded on one side with the pressure in said branch feed line and on the other with a control pressure and a spring, the control pressure being identical on all parallel connected restrictors, a separate branch control line delivering said control pressure to each parallel connected restrictor from a common control pressure line, check valve means opening toward the common control line in each branch control pressure line, an adjustable measuring restrictor in each branch line leading to a consumer and a control pressure line connected to said branch line between said adjustable measuring restrictor and the consumer, the improvement comprising said switching means including a valve housing having a plurality of longitudinal bores corresponding to the number of consumers, a main spool movable in each said bore, said main spool being hollow at each end, an inlet port in said housing connected to the main feed line and to each bore, an outlet connected to said control pressure means and each bore adjacent the inlet connection with the bore, secondary valve spools in each of the hollow ends of said main spool, spring means acting on each spool to urge the spools towards the ends of said main spool, and a plurality of radial passages spaced lengthwise on the main spool communicating with said hollow ends and forming with the secondary spools said parallel connected restrictors, an inlet chamber in the housing communicating with said bore intermediate its ends and communicating between said bore and the feed line, an exhaust chamber at each end of the housing communicating with the bore and said reservoir, a work chamber at each end of the housing intermediate the inlet and exhaust chambers and connected to the consumers of pressure fluid, a spring means in each of said hollow ends acting on said secondary spools to urge them towards the two ends of said spool, the plurality of spaced radial passages in said main spool communicating with said hollow ends, said radial passages being spaced so that in a working postion they communicate between and variably restrict flow between the work chambers and one of the inlet chambers in one position and the exhaust chambers in a second position, and wherein in each work position the radial passages in the main spool and the sensing grooves and passages in the secondary spools are arranged so that when the main spool is moved to connect the inlet chamber with a work chamber the end of the secondary piston on the end through which such connection is made opposite the spring is connected with a radial passage acting as a measuring restrictor and the end of the secondary spool loaded by the spring is connected through a radial passage in the main spool through a sensing passage in the secondary spool and the other secondary spool on the end of the main spool connecting the opposite work chamber and the exhaust chamber, the spring end of the secondary spool connects the opposite work chamber through the sensing groove at that end and a sensing passage with the end of the secondary spool opposite the spring to move the secondary spool against the spring to connect the work chamber and exhaust chamber, and wherein the side of the secondary spool loaded with the pressure spring can also be connected through a check valve with the work chamber connected with the consumer.

2. A hydrostatic drive system as claimed in claim 1 wherein an annular transfer groove is provided in each of the secondary spools intermediate their ends selectively to connect the said radial passages within the hollow ends of the main spool, and annular sensing grooves are provided in the secondary spool at each end with sending passages extending from each sensing groove to the opposite end of the secondary spool for delivery fluid thereto.

3. Drive system according to claim 1 or 2, wherein the check valve is located in a borehole of the secondary spool, which empties in the face of the secondary spool that is loaded with the pressure spring.

4. In a hydrostatic drive system having an adjustable pump, an adjusting element on said pump, a pump servo piston connected to and capable of moving said adjusting element, said servo piston being movable in a cylinder, a main feed line from said pump, a plurality of consumers of pressure fluid, a branch feed line connecting each said consumer to said main feed line a return line from each consumer to a reservoir, a switching means in each branch line, a pair of adjustable parallel connected restrictors in each branch line, an adjusting element in each of said parallel connected restrictors loaded on one side with the pressure in said branch feed line and on the other with a control pressure and a spring, the control pressure being identical on all parallel connected restrictors, a separate branch control line delivering said control pressure to each parallel connected restrictor from a common control pressure line, check valve means opening toward the common control line in each branch control pressure line, an adjustable measuring restrictor in each branch line leading to a consumer and a control pressure line connected to said branch line between said adjustable measuring restrictor and the consumer, the improvement comprising said switching means including a valve housing having a plurality of longitudinal bores corresponding to the number of consumers, a main spool movable in each said bore, said main spool being hollow at each end, an inlet port in said housing connected to the main feed line and to each bore, an outlet connected to said control pressure means and each bore adjacent the inlet conection with the bore, secondary valve spools in each of the hollow ends of said main spool, spring means acting on each spool to urge the spools towards the ends of said main spool, and a plurality of radial passages spaced lengthwise on the main spool communicating with said hollow ends and forming with the secondary spools said parallel connected restrictors, and wherein the hollow ends of the main spool are formed by a longitudinal borehole that goes all the way through the main spool and is closed on the end by a plug, said longitudinal bore hole having a large diameter in the outer ends, a medium diameter in an intermediate zone connected to the large diameter, and the narrowest diameter in a central cone between said intermediate cone, a secondary spool in each large diameter end capable of sliding therein, the side of which secondary spool that faces the plug being supported against a pressure spring and on the other side is supported against a stop, the space lying between the secondary spool and the plug being connected through boreholes in the secondary spool with an annular groove on the latter and the secondary spool lying in its face region against a shoulder of the main spool, and where a compensating piston is provided in and capable of sliding in the narrowest zone, the side of which piston facing the middle of the main spool is connected with the outlet chamber that is loaded with the control pressure and which lies with its opposite side against a sliding sleeve valve, which is capable of sliding in the region of medium diameter of the borehole and which in turn has an axial borehole, whose diameter is identical to the diameter of the narrowest borehole section of the longitudinal borehole of the main spool, a piston capable of sliding in this borehole of the sliding sleeve valve is provided and it is supported against the face of the auxiliary piston.

5. Drive system according to claim 4, wherein at least one radial borehole is provided in the valve piston, the inner mouth of which lies in the region of the axial borehole of minimum diameter and is arranged so that it can be covered by the compensating piston on its displacement path and whose outer mouth is arranged so that it is covered, depending on the displacement position of the main spool, either by the wall of the borehole in which the main spool is capable of sliding, or is connected with the outlet chamber connected to the control pressure.

6. Drive system according to claim 4, wherein a pressure compensating channel is provided in the sliding sleeve valve, which connects the space in front of the face of the sliding sleeve valve with the space in front of the annular face of the sliding sleeve valve and an additional radial borehole is provided, which connects the space in the borehole in front of the face of the secondary spool with an inner annular groove of the sliding sleeve valve, whereby this radial borehole is arranged in the sliding sleeve valve so that the radial boreholes in the main spool acting as measuring restrictors empty into this inner annular groove.

7. Drive system according to claim 4, wherein the space in the inner axial borehole of the sliding sleeve valve in front of the face of the piston capable of sliding in it is connected through boreholes in the piston with an inner annular groove provided in the latter, in which case the radial borehole acting as the measuring restrictor empties into the inner annular groove.

8. Drive system according to claim 4, wherein the edge of the sliding sleeve valve directed toward the outer side of the main spool forms a variable restrictor with the edge of the borehole in the main spool.

* * * * *